United States Patent [19]
Bandy

[11] 3,933,144
[45] Jan. 20, 1976

[54] BARBECUE GRILL CONSTRUCTION

[76] Inventor: Clyde Bandy, 7138 Conley, Houston, Tex. 77021

[22] Filed: July 13, 1973

[21] Appl. No.: 379,112

[52] U.S. Cl............... 126/25 R; 126/25 B; 99/480
[51] Int. Cl.² ..................... A47J 37/07; F24B 3/00
[58] Field of Search .............. 126/25 B, 25 R, 59.5; 110/1 F; 99/426, 480; 98/121 R, 40 C

[56] References Cited
UNITED STATES PATENTS

| | | | |
|---|---|---|---|
| 924,315 | 6/1909 | Bvehrins | 126/25 B |
| 1,398,726 | 11/1921 | Koehler | 99/480 X |
| 1,461,496 | 7/1923 | Quist | 126/25 B |
| 3,489,132 | 1/1970 | West | 126/25 R X |
| 3,515,052 | 6/1970 | Brandes | 98/40 C X |

Primary Examiner—William F. O'Dea
Assistant Examiner—Harold Joyce
Attorney, Agent, or Firm—Hubbard, Thurman, Turner & Tucker

[57] ABSTRACT

A barbecue grill for cooking food with charcoal fuel or the like is disclosed as including a housing having a lower portion including a rack on which the fuel to be burned is located, and an upper portion having a cooking grill on which food to be cooked is placed. The upper portion is closed in by a cover which includes an adjustable opening for controlling the smoke content of the grill during cooking. A novel fuel igniter is provided on the rack holding the charcoal and is movable between an upright position in which the charcoal is ignited and a second position in which the lighter is protected from drippings from the food being cooked.

1 Claim, 7 Drawing Figures

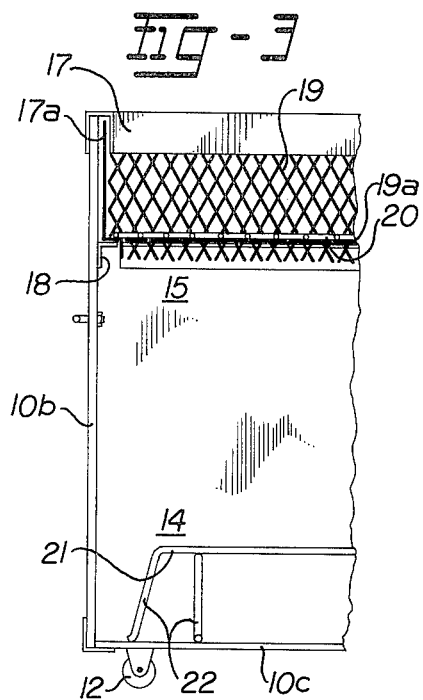
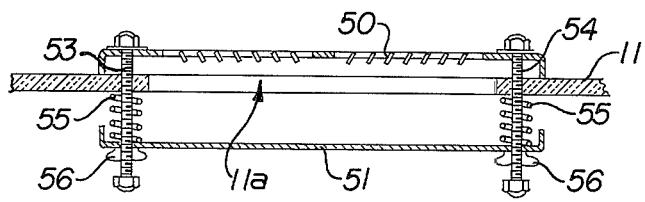
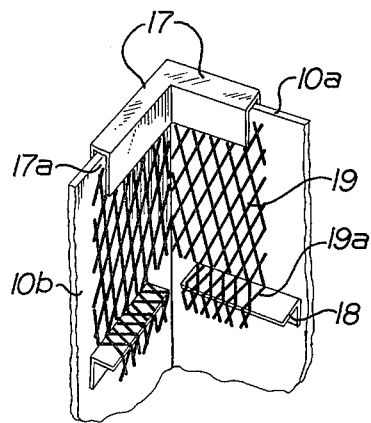
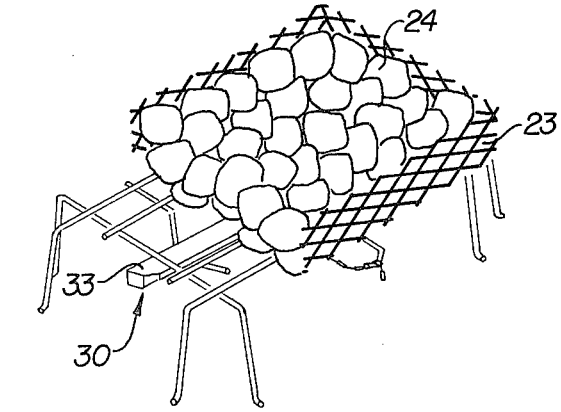
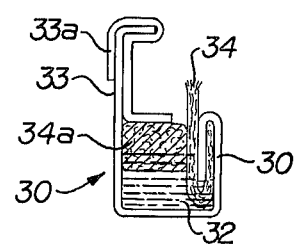

BARBECUE GRILL CONSTRUCTION

This invention relates to a barbecue grill and one of its aspects to such a grill including a novel igniter mechanism for starting charcoal fuel or similar fuel used for cooking. In another aspect of this invention it relates to such a grill which includes a novel air control mechanism for controlling the accumulation of smoke in the grill during cooking.

While barbecue grills of different construction are widely known, the lighting of charcoal where it is used as the fuel has always been and continues to be a problem. While electric charcoal starters have been provided these require connection to large amounts of current, and thus limit the portability of the grill, and can only start coals that actually lay against the element of the starter. Also, liquid starting fuels which are commonly used provide some element of danger, particularly since they burn down and hot coals have to be sprayed with the fuel to continue the starting process.

Thus, it is the primary object of this invention to provide a barbecue grill which includes a fuel igniter for causing charcoal fuel to burn which does not require electric power nor the spraying of a liquid starter directly on the charcoal.

Another object of this invention is to provide such an igniter which utilizes commonly available fuels, such as lighter fluid, which is relatively safe, and which can be economically manufactured.

Another object of this invention is to provide such an igniter which uses a wick and can provide a relatively even flame over a large part of an area in which the charcoal to be burned is located.

Another object of this invention is to provide such an igniter in which the wick may be rotated to a position where it is shielded from the drippings of cooking food after the charcoal is started.

Also, the better barbecue grills provide for low direct heat on the food being cooked and considerable smoking of the food. However, a difficult problem in these grills is a regulation of the amount of heat and smoke in the grill under different conditions of cooking. It is therefore another object of this invention to provide a barbecue grill including an improved mechanism for adjusting the flow of air out of the grill during cooking, and thus the build up of smoke in the grill.

Another object of this invention is to provide an overall construction of grill utilizing the above features in an attractive housing, and in which the parts to be cleaned can be readily removed and replaced.

These and other objects of this invention, which will become more apparent upon consideration of the attached claims and drawings and of the following detailed description, are provided in accordance with the preferred embodiment of this invention illustrated by a barbecue grill having an upright housing including a lower portion in to which a cooking fuel, such as charcoal or the like, is placed, and an upper portion having a grill on which food to be cooked is placed. A novel fuel igniter having an elongated trough for storage of a liquid fuel, such as lighter fluid, and a wick extending from the trough is provided on the bottom of a rack under which charcoal is to be placed. The length of the elongated trough is generally substantially the length of the portion of the rack on which charcoal is to be placed. It is preferred that the igniter be placed on the bottom of the rack so that it can be easily removed for fueling and cleaning, and also be rotated from a first position in which the wick is substantially upright for lighting the charcoal, to a second position in which the wick is turned down on its side. A shield member extends from the trough so that as the wick is rotated to the second position described it is shielded from drippings from the food being cooked by the shield member, and the life of the wick is increased.

It is also preferred that the upper part of the housing be enclosed by a cover which can be opened and closed to permit placement and removal of the food being cooked onto the cooking grill. Smoke and heat in the grill is regulated by an air control means centrally located over the grill and over and about an opening in the cover. In order to regulate the amount of smoke an adjustable plate is provided partially closing off the opening in the cover and the plate is adjustable between a position fully closing the opening and to a position in which the opening is only partially closed. By proper adjustment of the position of the plate over the opening, the amount of heat and smoke in the grill can be regulated to suit a desired cooking situation.

In the drawings, wherein like reference numerals are used throughout to show like parts, and wherein a preferred embodiment of this invention is illustrated:

FIG. 3 is a sectional view taken at 3—3 in FIG. 2;

FIG. 4 is a sectional view taken at 4—4 in FIG. 2.

FIG. 5 is a view in elevation of the rack and fuel igniter of this invention;

FIG. 6 is a view similar to FIG. 5 showing the position of the igniter after it has been used; and FIG. 7 is a cross-sectional view taken at 7—7 in FIG. 5.

FIG. 8 is a view in elevation taken at one of the upper corners of the barbecue grill of FIG. 1.

Figure 1:
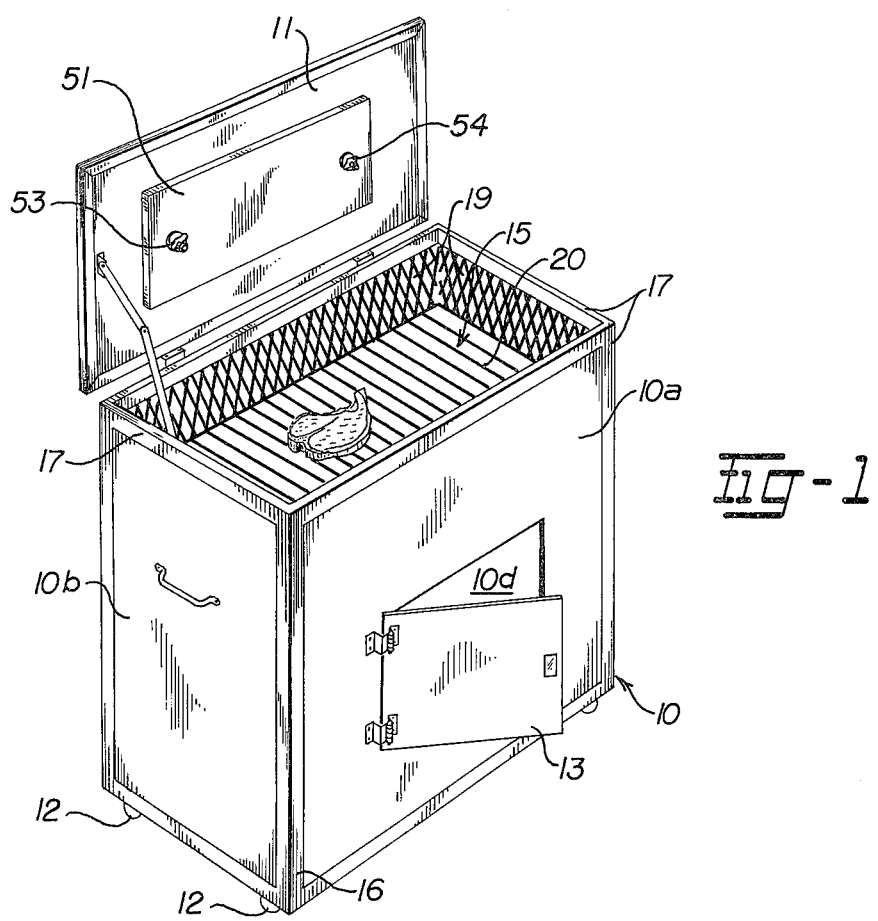
FIG. 1 is a view in elevation of the barbecue grill of this invention showing the upper cover open.
Figure 2:
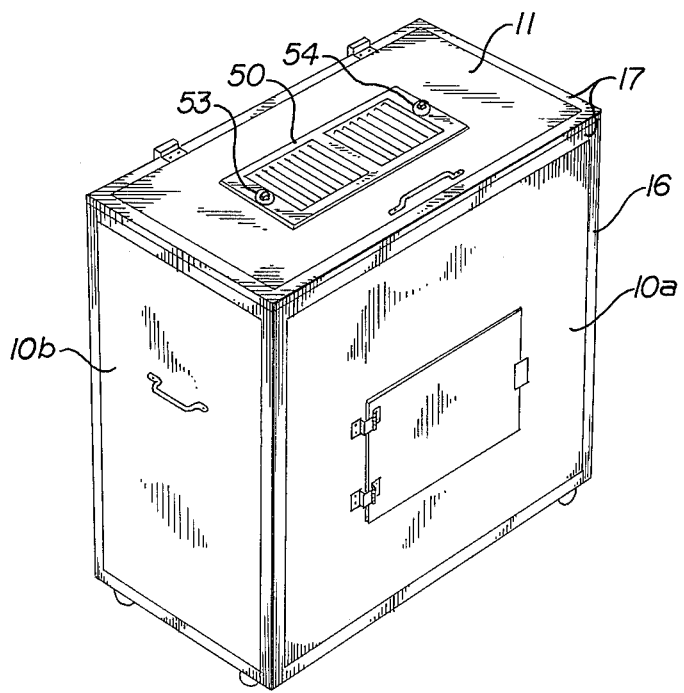
FIG. 2 is a view in elevation similar to FIG. 1, however with the upper cover closed.

Referring to the drawings, an upright, box like housing 10 forms the basic structure of the barbecue grill of this invention. Housing 10 includes front panels 10A and side panels 10B, as shown; an enclosed bottom 10C (see FIG. 3) and a cover 11 pivotally mounted at the top of housing 10 by hinges and movable between the open position shown in FIG. 1 and a closed position as shown in FIG. 2. It is preferred that box 10 be mounted on wheels or rollers 12 to aid its mobility. Also, front panel 10A of housing 10 includes an opening 10D therein over which a door 13 is pivotally mounted on front panel 10A by hinges in order to open and close the opening, and to permit access to the interior of housing 10. As illustrated in FIG. 3 the interior of housing 10 includes a lower portion 14 and an upper portion 15, (also partially shown in FIG. 1), so that access to lower portion 14 is provided by door 13 and access to upper portion 15 is provided by cover 11.

Housing 10 is preferably made of asbestos or other fireproof panels, such as panels 10A, 10B, 10C and 11, which are connected together at their edges by aluminum L-shaped members 16 to form a box. Rivets or screws may be used to provide these connections. The top edges of panels 10A and 10B include U-shaped aluminum brackets 17 which overlap the top edges of panels 10A and 10B. Also, brackets 17 are spaced from panels 10A and 10B on the inside of housing 10 so that slots 17A are provided around the inside edge of the top opening of housing 10, between the overhang of bracket 17 and panels 10A and 10B. L-shaped mounting brackets 18 are also mounted around the interior of housing 10 a short distance below the top opening of housing 10, as shown in FIG. 3. Four heat retaining grill like members 19, two along the inside of panels 10A and two along the inside of panels 10B, are mounted on brackets 18 around the interior of housing 10 and extend up into the slot 17A formed between strip member 17 and the side panels of housing 10. Also, members 19 are bent at a right angle at their end opposite from that inserted in slot 17A to form a shoulder 19A which sits on bracket 18. In this manner each of the members 19 can be easily removed from housing 10 and cleaned and replaced back in the housing. Also, a grill 20, on which food to be cooked is placed, is placed in upper portion 15 of housing 10 on the shoulders formed on top of brackets 18 by members 19. Grill 20 is maintained loose so that it can be easily removed for cleaning or access to the interior of housing 10.

FIGS. 5, 6 and 7 illustrate the fuel igniter of this invention. As illustrated in FIG. 5 a rack 21 including a plurality of legs 22 for supporting it in lower portion 14 of housing 10, is provided for supporting a basket 23 (FIG. 6) into which a quantity of charcoal 24 is placed. Rack 21 is preferably an open wire structure and includes 2 hook-like wire members 25 and 26 made of stiff wire extending below the rack, and these members function as a means for mounting the fuel igniter of this invention on and below the top surface of rack 22.

As shown in FIGS. 5 and 7, a preferred form of the fuel igniter 30 of this invention, having an elongated body 31, is loosely placed on and across members 25 and 26 so that igniter 30 may be freely moved. Igniter 30 is preferably made of sheet metal bent to provide an elongated trough 32 for the accumulation of a liquid fuel, such as lighter fluid, and includes a sheet metal shield member 33 extending up from the trough to provide a shield for an elongated wick 34 which is placed between bent portions of the sheet metal forming body 31, to extend from trough 32 upwardly towards rack 21. Absorbant packing 34a may also be provided in trough 32 for keeping liquid about the wick. When igniter 30 is placed on members 25 and 26 in an upright position, such as shown in FIG. 5, liquid fuel can be placed in trough 32, and the fuel will be drawn up wick 34, so that a flame below and along the length of rack 21 will be provided when the wick 34 is lit. A sheet metal strip 33a may be bent over shield member 33 to form an integral part thereof, and bent over trough 32 as shown to provide a cover for the trough. Thus, when basket 23 is placed on rack 21 after wick 34 is lit, charcoal 24 will be ignited by this flame. After this is done, and all of the fuel in trough 32 has been burned, igniter 30 may be caused to lie on its side, as shown in FIG. 6, by pulling on a chain 35 provided for this purpose and connected to igniter 30. When this is done, shield members 33 and 33a will lie over wick 33 and protect the wick from grease and other drippings falling from the food being cooked. As shown in FIG. 5, wire members 25 and 26 are in the configuration of a check mark and inclined to permit igniter lie down as shown in FIG. 6.

Referring now to FIG. 4, the details of a preferred form of the air (smoke) control mechanism are shown. A rectangular opening 11A is provided in cover 11 and opening 11A is slightly smaller than the size of a louvered grill 50 mounted on the top of cover 11 over opening 11A, (FIG. 2) and slightly smaller than a plate 51 mounted on the bottom of lid 11 over opening 11A (FIG. 1). Grill 50 and plate 51 are mounted on cover 11 by the same mounting bolts 53 and 54 which pass through cover 11 on each side of opening 11A.

As shown in FIG. 4 a coil spring 55 is provided about each of bolts 53 and 54 and between the bottom of cover 11 and the top of plate 51. Wing nuts 56 are screwed on to bolts 53 and 54 on the bottom side of plate 51. Thus, springs 55 normally urge plate 51 away from a position where it shuts or partially shuts opening 11A closed, and the position of plate 51 over opening 11A can be adjusted by running wing nuts 56 back and forth on bolts 53 and 54. In this manner the amount of opening and closing of opening 11A can be easily adjusted to regulate the amount of smoke retained in the grill during cooking. Also, by the arrangement described grill 50 and plate 51 can be easily removed for cleaning as can cooking grill 20 and the heat retaining members 19. If desired, as an aid in keeping the unit clean and to prevent meat from sticking to the cooking grill 20, this grill and the metal component below it (basket 23 and stand 21) can be coated with Teflon.

Also, as can be appreciated from the drawings, the grill of this invention is such that the cooking coals are a sufficient distance below the meat being cooked that by proper regulation of the opening about plate 51 chances of burning of the meat can be avoided or reduced. Also, the size of basket 23 can be such that when filled with coals no more coals than needed to properly cook the meat are provided. Also, during construction of the unit it is preferred that the strip member 16 and 17 be connected to the panel members 10a, 10b, and 11 by rivets.

Thus, it can be readily seen that a simple, efficient cooking grill is provided which is easy to build, provides for easy charcoal starting, good regulation of air and smoke, and is relatively easy to keep clean.

From the foregoing, it will be seen that this invention is one well adapted to attain all of the ends and objects hereinabove set forth, together with other advantages which are obvious and which are inherent to the apparatus.

It will be understood that certain features and subcombinations are of utility any may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A barbeque grill for cooking food with charcoal fuel, or the like, comprising, in combination: an upright housing having a lower portion in which the fuel is burned and an upper portion in which the food to be cooked is to be placed; grill means in said upper portion for supporting the food to be cooked; a cover attached to said housing to permit access to said upper portion for placement of food to be cooked, said cover including an opening therethrough; air control means disposed on said cover about said opening and including means for adjusting the quantity of air flow through said opening for controlling the flow of smoke from said housing, said air control means including a louvered member mounted over said opening on the out-side of said cover, and a plate mounted over said opening on the inside of said cover, and means for so mounting said plate while permitting movement of said plate to and from said opening, said means including resilient means for biasing said plate away from said opening; rack means in said lower portion for supporting said fuel for burning; and a wick type fuel igniter located in said lower portion and disposed to rotate from a first position for lighting said fuel, to a second position wherein the wick is protected from drippings from the food being cooked, said igniter including an elongated trough for accumulation of a liquid fuel, an elongated wick extending from said trough and a shield member extending from the side walls of said trough and extending over said trough to shield said wick when in second position, and further including mounting means for mounting said igniter on and beneath said rack for movement between said first and second position, and a door in said housing for permitting access to said lower portion thereof.

* * * * *